(12) United States Patent
Thokala et al.

(10) Patent No.: US 11,714,574 B2
(45) Date of Patent: Aug. 1, 2023

(54) MANAGING MEMORY COMMAND ENGINE USING COMMAND SEQUENCE ANALYSIS

(71) Applicant: Micron Technology, Inc., Boise, ID (US)

(72) Inventors: Arun Kumar Reddy Thokala, Telangana (IN); Ameer Bhargav Kilari, Andhra Pradesh (IN); Rajan Rishi, Punjab (IN); Badal Nilawar, Maharashtra (IN)

(73) Assignee: Micron Technology, Inc., Boise, ID (US)

( * ) Notice: Subject to any disclaimer, the term of this patent is extended or adjusted under 35 U.S.C. 154(b) by 101 days.

(21) Appl. No.: 17/347,198

(22) Filed: Jun. 14, 2021

(65) Prior Publication Data

US 2022/0398035 A1    Dec. 15, 2022

(51) Int. Cl.
    *G06F 3/06*    (2006.01)
(52) U.S. Cl.
    CPC .......... *G06F 3/0659* (2013.01); *G06F 3/0613* (2013.01); *G06F 3/0619* (2013.01); *G06F 3/0631* (2013.01); *G06F 3/0679* (2013.01)

(58) Field of Classification Search
    CPC .... G06F 3/0659; G06F 3/0613; G06F 3/0619; G06F 3/0631; G06F 3/0679; G06F 3/0625
    See application file for complete search history.

(56) References Cited

U.S. PATENT DOCUMENTS

| | | | |
|---|---|---|---|
| 11,093,135 B1* | 8/2021 | Ali | G06F 3/0673 |
| 2011/0314196 A1* | 12/2011 | Ortiz | G06F 13/426 |
| | | | 710/106 |
| 2014/0181555 A1* | 6/2014 | Bodas | G06F 1/324 |
| | | | 713/323 |
| 2015/0177817 A1* | 6/2015 | Badri | G06F 1/3231 |
| | | | 713/320 |
| 2020/0026465 A1* | 1/2020 | Jung | G06F 3/0604 |

FOREIGN PATENT DOCUMENTS

CN    115543186 A    12/2022

* cited by examiner

*Primary Examiner* — Eric Cardwell
(74) *Attorney, Agent, or Firm* — Schwegman Lundberg & Woessner, P.A.

(57) ABSTRACT

Various embodiments described herein provide for using analysis of a sequence of commands (issued by a host system) to manage a memory command component, such as a read engine or a write engine of a memory system.

20 Claims, 11 Drawing Sheets

MANAGING MEMORY COMMAND ENGINE USING COMMAND SEQUENCE ANALYSIS

TECHNICAL FIELD

Embodiments of the disclosure relate generally to memory devices and, more specifically, to using analysis of a sequence of commands (e.g., being issued by a host system) to manage a memory command component, such as a read engine or a write engine of a memory system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
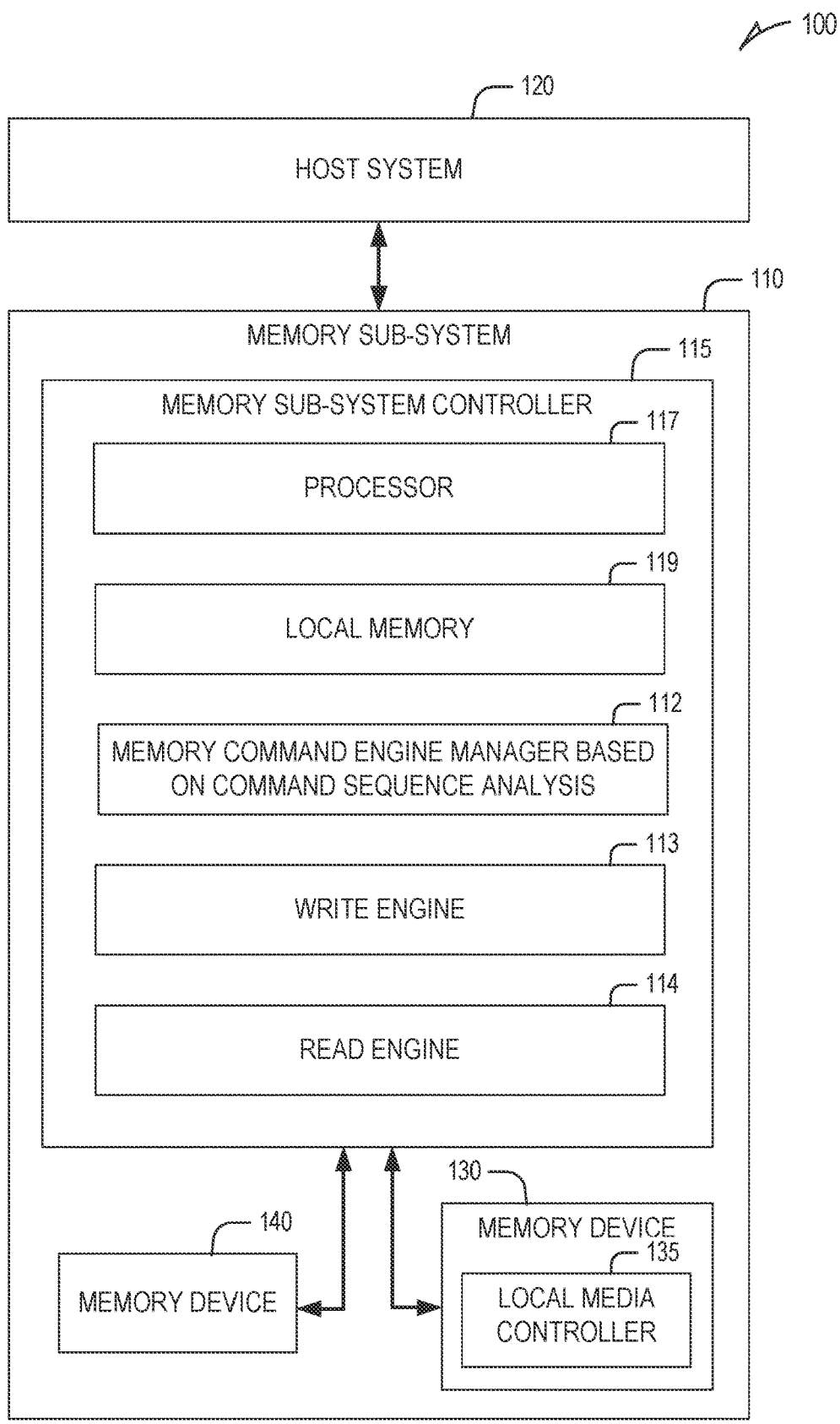
FIG. 1 is a block diagram illustrating an example computing system that includes a memory sub-system, in accordance with some embodiments of the present disclosure.

Aspects of the present disclosure are directed to using analysis of a sequence of commands (e.g., being issued by a host system) to manage a memory command component (e.g., engine), such as a read engine or a write engine of a memory system (e.g., a memory sub-system). As used herein, a memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data (e.g., host data). The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table, also referred to herein as a L2P table), data from logging, scratch pad data, and so forth.

A memory device can be a non-volatile memory device. A non-volatile memory device is a package of one or more die. Each die can be comprised of one or more planes. For some types of non-volatile memory devices (e.g., negative-and (NAND)-type devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package.

Memory systems, such as solid-state drives (SSDs), traditionally leave their respective read and write component (e.g., engines) enabled (e.g., active or on) regardless of the type of command workload (e.g., long sequence of read commands or write commands) currently being handled by the memory systems. As a result, during certain command workloads, conventional memory systems consume a lot of power. For instance, on average, a conventional SSD (such as peripheral component interconnect express (PCIe) Generate 3 SSD) can consume approximately 3.5 watts while performing input/output operations regardless of the type of command workload is currently handling. With the advent of thin and light mobile devices (e.g., laptop that use lighter batteries with less capacity), the importance of reducing the power consumption of their various components, including their memory systems, has only increased.

Aspects of the present disclosure address the above and other deficiencies by using analysis of a sequence of commands (e.g., being received from a host system) to manage a memory command component (e.g., engine), such as a read engine or a write engine of a memory system (e.g., a memory sub-system). For instance, as a host system interacts with a memory using read and write commands, the memory system (e.g., SSD) can process one command at a time by allocating and using the resources of a read engine or a write engine of the memory system. Accordingly, at a given point of time, a particular type of command workload (e.g., either read or write command workload) can be observed on the memory system. For example, while a host system (e.g., laptop) is booting up, a memory system coupled to the host system will primarily handle a read command workload, and when a file is being copied on the host system, the memory system will primarily handle a write command workload. Various embodiments described herein provide for an algorithm that manages (or assists in managing) power consumption of a memory system by segregating a read component (e.g., engine) or a write component (e.g., engine) of the memory system and enabling/disabling the read component, the write component, or both (e.g., by turning on/off their specific components (e.g., IP or circuitry) according to a hardware map) based on a current or upcoming command workload of the memory system (e.g., determined based on analysis of commands being received from a host system to determine a pattern of commands queued for execution).

In particular, some embodiments analyze a sequence (or series) of commands of a single command type (e.g., sequence of read commands or sequence of write commands) that are queued next for execution by the memory system, and based on this analysis, cause a write component (e.g., engine) of the memory system to be enabled or disabled, cause a read component (e.g., engine) of the memory system to be enabled or disabled, or both. For instance, an embodiment can store commands received from a host system in a command table (or command queue), and analyze the command table to detect when a sequence of read commands are queued next to be retrieved from the command table for execution by the memory system, or when a sequence of write commands are queued next to be retrieved from the command table for execution by the memory system. Based on the analysis, the embodiment can cause the write component to be enabled (e.g., activated or on) or disabled (e.g., deactivated or off), or cause the read component to be enabled or disabled.

Additionally, various embodiments described herein can cause a disabled write component or a disabled read component to be enabled (e.g., reenabled) in view of a time latency parameter, which can permit an embodiment to reduce or eliminate any latency resulting from the enabling or disabling of the specific memory command components of the memory system (e.g., by moving from a power saving mode, such as a disabled read or write component, to a operational state, such as an enabled read or write component, for a certain type of command workload). For instance, when a write component is disabled (e.g., off) during a read command workload, the write component can be reenabled (e.g., turned on again) when a write command is detected in the command queue or when the write command is expected to be reached in the command queue within a certain amount of execution time. Likewise, when a read component is disabled (e.g., off) during a write command workload, the read component can be reenabled (e.g., turned on again) when a read command is detected in the command queue or when the read command is expected to be reached in the command queue within a certain amount of execution time.

By enabling and disabling a write component of a memory system, a read component of the memory system, or both, various embodiments can better manage power consumption by the memory system. Furthermore, various embodiments permit a memory system to manage power consumption of the memory system while the memory system is processing commands (e.g., performing input/output operations) on the memory system. Some embodiments described herein can be implemented in an existing memory system, such as an SSD, as firmware (e.g., algorithm in a command handler) without modification to the hardware of the existing memory system.

As used herein, a memory command engine of a memory system (e.g., memory sub-system) can comprise one or more components (e.g., hardware or firmware components) and data paths used by the memory system to access one or more memory devices of the memory system. As used herein, a write engine of a memory system can comprise one or more components and data paths used by the memory system to facilitate writing data to one or more memory devices of the memory system. As used herein, a read engine of a memory system can comprise one or more components and data paths used by the memory system to facilitate reading data from one or more memory devices of the memory system. As used herein, enabling or disabling a memory command engine can comprise causing (or controlling) one or more voltage gates associated with the memory command engine (e.g., voltage gates for components of the memory command engine) to be turned on or turned off.

As used herein, a command workload (or workload) can refer to a sequence of commands for a single command type, where the command type can be a memory system-to-host system type (hereafter, referred to as a M2H command type), such as a read command, or a host system-to-memory system type (hereafter, referred to as a H2M command type), such as a write command. For instance, a M2H workload type could comprise a sequence (or series) of read commands received from a host system and stored in a command queue of a memory system, from which the memory system retrieves and executes commands. In another instance, a H2M workload type could comprise a sequence (or series) of write commands received from a host system and stored in a command queue of a memory system. As used herein, a read command can comprise a type of command that facilitates a memory M2H data transfer, and a write command can comprise a type of command that facilitates a H2M data transfer. The type of command associated with a specific command can be determined based on an operation code (opcode) of the specific command.

As used herein, a command table of a memory system can function as a command queue that stores commands retrieved from a host system and stores commands in association with an index or a tag. For some embodiments, the order in which indexes/tags are allocated (e.g., associated) to the commands in the command table based on available space in the command table. Commands are generally retrieved from the command table and executed in the order in which they are received by the memory sub-system.

Disclosed herein are some examples of using analysis of a sequence of commands to manage a memory command engine, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a SSD, a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a PCIe controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a PCIe interface, USB interface. Fibre Channel, Serial Attached SCSI (SAS). Small Computer System Interface (SCSI), a double data rate (DDR) memory bus, a DIMM interface (e.g., DIMM socket interface that supports Double Data Rate (DDR)). Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND type flash memory and write-in-place memory, such as a three-dimensional cross-point (3D cross-point) memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and 3D NAND.

Each of the memory devices 130 can include one or more arrays of memory cells. One type of memory cell, for example, single-level cells (SLCs), can store one bit per cell. Other types of memory cells, such as multi-level cells (MLCs), triple-level cells (TLCs), quad-level cells (QLCs), and penta-level cells (PLCs), can store multiple bits per cell. In some embodiments, each of the memory devices 130 can include one or more arrays of memory cells such as SLCs. MLCs. TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., LBA, namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a memory command engine manager 112 based on command sequence analysis (hereafter, the memory command engine manager 112), a write engine 113, and a read engine 114. According to various embodiments, the memory command engine manager 112 enables or facilitates operations with respect to enabling or disabling the write engine 113, the read engine 114, or both based on analyzing a sequence of commands of a same command type (e.g., read command type and write command type) stored in a command queue (e.g., command table) of the memory sub-system 110, where the sequence of commands is queued next in the command queue for execution on the memory sub-system 110 (e.g., by the memory sub-system controller 115). The commands stored in the command queue can be received, or retrieved, from the host system 120. Depending on the embodiment, the command queue of the memory sub-system 110 can be a part of the memory sub-system controller 115 (e.g., implemented on the local memory 119), or external to the memory sub-system controller 115. Additionally, for some embodiments, the command queue comprises a command table that stores commands in association with an index or a tag, where the order in which indexes/tags are allocated (e.g., associated) to the commands in the command table determines the order in which commands are iterated over and analyzed in the command queue (e.g., command table) to determine the sequence of commands.

which commands are retrieved from the command table (e.g., by the memory sub-system controller 115) for execution on the memory sub-system 110.

For some embodiments, the write engine 113 comprises one or more components (e.g., hardware IP or circuitry) of the memory sub-system 110 that enable or facilitate writing data on one or more of the memory devices 130, 140. For some embodiments, the read engine 114 comprises one or more components (e.g., hardware IP or circuitry) of the memory sub-system 110 that enable or facilitate read data from one or more of the memory devices 130, 140. According to some embodiments, the memory command engine manager 112 uses a map (e.g., hardware map) to enable or disable the one or more components of the write engine 113. For instance, the memory command engine manager 112 can use the map to determine (e.g., identify) which components within the memory sub-system 110 are associated with (e.g., implement) the write engine 113; the identified components are enabled when the write engine 113 is enabled and disabled when the write engine 113 is disabled. Similarly, for some embodiments, the memory command engine manager 112 uses a map to enable or disable the one or more components of the read engine 114. For instance, the memory command engine manager 112 can use the map to determine (e.g., identify) which components within the memory sub-system 110 are associated with (e.g., implement) the read engine 114; the identified components are enabled when the write engine 113 is enabled and disabled when the write engine 113 is disabled. For some embodiments, one or more components are associated with (e.g., used by or shared by) both the write engine 113 and the read engine 114 and, as a result, disabling the write engine 113 or disabling the read engine 114 would not cause those one or more shared components to be disabled.

The memory command engine manager 112 can implement various embodiments on the memory sub-system 110 by performing operations in accordance with methods described herein, such one of the methods described with respect to FIGS. 3-9. For instance, the memory command engine manager 112 can cause the memory sub-system controller 115 operations in accordance with one or more of methods 300, 400, 500, 600, 700, 800, 900 of FIGS. 3-9.

Figure 2:
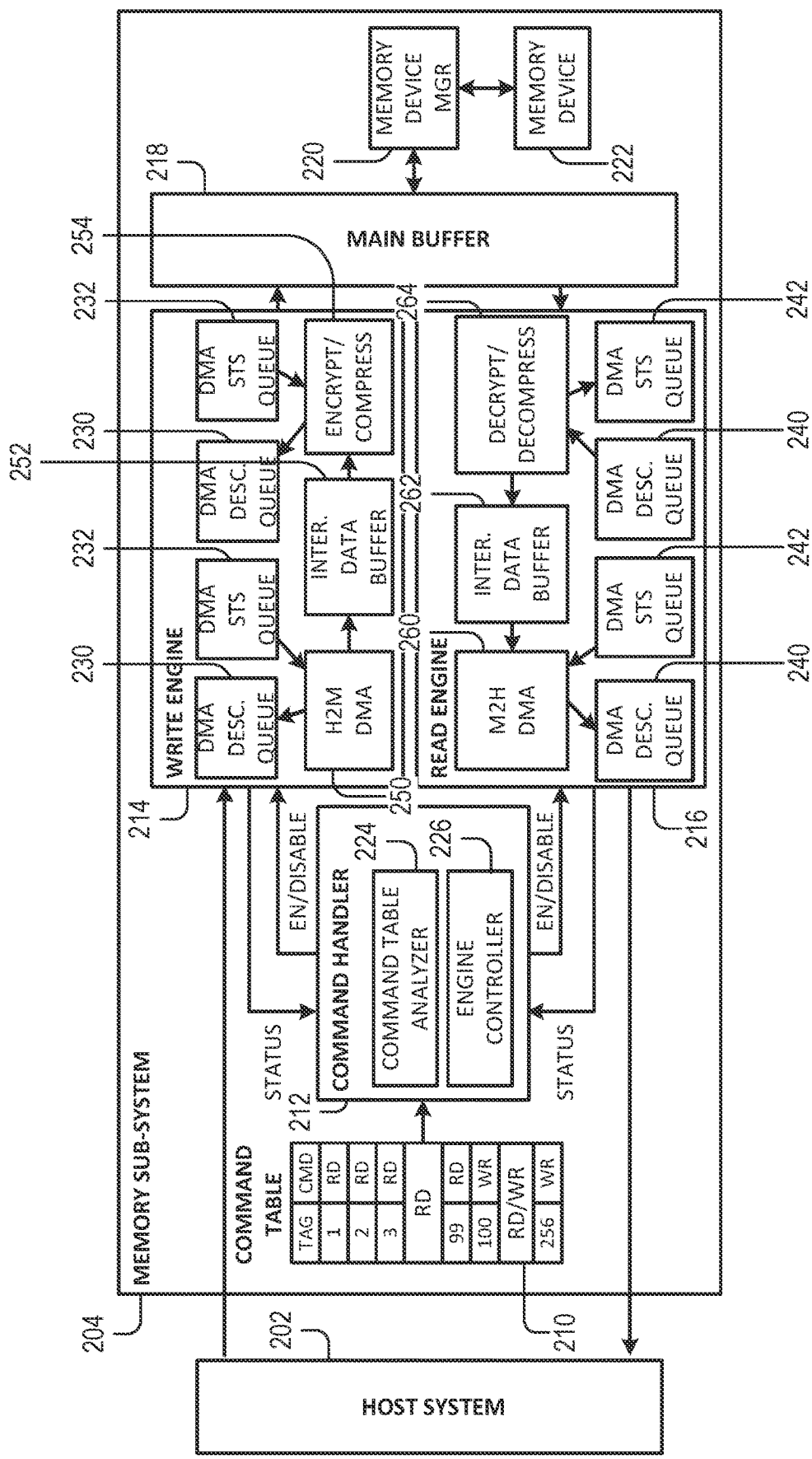
FIG. 2 is a diagram illustrating an example memory sub-system that uses analysis of a sequence of commands to manage a memory command component, in accordance with some embodiments of the present disclosure.

FIG. 2 is a diagram illustrating an example memory sub-system 204 that uses analysis of a sequence of commands to manage a memory command engine, in accordance with some embodiments of the present disclosure. As shown, a host system 202 is coupled to, and interacts with, the memory sub-system 204. The memory sub-system 204 comprises a command table 210, which can function as a command queue for commands, for the memory sub-system 204, from the host system 202. The memory sub-system 204 comprises a command handler 212, a write engine 214, a read engine 216, a main buffer 218, a memory device manager 220, and a memory device 222.

The command handler 212 implements the enabling and disabling of the write engine 214, the read engine 216, or both in accordance with various embodiments described herein. The command handler 212 can handle execution of commands from the command table 210 using either the write engine 214, the read engine 216, or both. The write engine 214 comprises one or more components (e.g., hardware IP and circuitry) that facilitates writing data to the memory device 222 (via the main buffer 218 and the memory device manager 220) based on execution of a write command from the command table 210. Similarly, the read engine 216 comprises one or more components (e.g., hardware IP and circuitry) that facilitates read data from the memory device 222 (via the main buffer 218 and the memory device manager 220) based on execution of a read command from the command table 210. As shown, the write engine 214 comprises a H2M direct memory access (DMA) 250 component, an intermediate data buffer 252, an encryption/compression 254 component, a DMA description queue 230, and a DMA status queue 232. As a write command is executed, data flows from the H2M DMA 250 component, to the intermediate data buffer 252, and to the encryption/compression 254 component, where both the H2M DMA 250 component and the encryption/compression 254 component access the DMA description queue 230 and the DMA status queue 232 as they operate. Eventually, data flows out of the write engine 214 and to the memory device 222 for storage via the main buffer 218 and the memory device manager 220.

As also shown, the read engine 216 comprises a M2H DMA 260 component, an intermediate data buffer 262, an decryption/decompression 264 component, a DMA description queue 240, and a DMA status queue 242. As a read command is executed, data flows from the memory device 222 to the read engine 216 via the memory device manager 220 and the main buffer 218. Within the read engine 216, data flows from the decryption/decompression 264 component, to the intermediate data buffer 262, and to the M2H DMA 260 component, where both the M2H DMA 260 component and the decryption/decompression 264 component access the DMA description queue 240 and the DMA status queue 242 as they operate. For some embodiments, the DMA description queue 230 and the DMA description queue 240 represent a component shared by the write engine 214 and the read engine 216, and the DMA status queue 232 and DMA status queue 242 represent another component shared by the write engine 214 and the read engine 216.

The command table 210 stores commands from the host system 202 according to tags (e.g., 1-256), which are used to index the commands within the command table 210. As shown, the command table 210 comprises 256 tagged slots for storing commands. The size or depth of the command table 210 can vary between different embodiments. In FIG. 2, the command table 210 is presently storing a sequence of read (RD) commands from tag 1 to 99, and a mix of read (RD) and write (WR) commands from tags 100 to 256. Depending on the embodiment, the commands stored in the command table 210 can be retrieved by the memory sub-system 204 from the host system 202 (e.g., fetched or pulled from a host system command queue on the host system 202 rather than pushed from the host system 202 to the memory sub-system 204). Additionally, commands can be retrieved, from the host system 202, into the command table 210 according to space availability in the command table 210. For instance, as commands are retrieved from the command table 210 by the command handler 212 for execution, and space becomes available in the command table 210 as a result of such retrieval, more commands can be retrieved from the host system 202 into the command table 210.

For command processing/execution on the memory sub-system 204, the command handler 212 can retrieve (e.g., remove) individual commands from tagged slots of the command table 210 for execution. For some embodiments, individual commands are retrieved from the command table 210 (e.g., by the command handler 212) according to the sequential order in which commands the commands are stored (e.g., placed) into the command table 210. According to some embodiments, the sequential order of executing commands within the command table 210 is not determined by the sequential order of the tags but, rather, the order in which commands are received by the memory sub-system 204. For some embodiments, an individual command is stored in an individual tagged slot of the command table 210 that is currently available (e.g., not currently storing a command or marked as available). An individual tagged slot can become available, for example, after a currently stored command has been retrieved (e.g., removed) from the individual tagged slot for execution by the command handler 212. For some embodiments, the order in which indexes/tags are allocated (e.g., associated) to the commands in the command table 210 determines the order in which commands are iterated over and analyzed in the command table 210 to determine the sequence of commands.

The command handler 212 comprises a command table analyzer 224 and an engine controller 226. According to some embodiments, one or both of the command table analyzer 224 and the engine controller 226 represent an implementation of the memory command engine manager 112 described with respect to FIG. 1. For some embodiments, the command table analyzer 224 retrieves individual commands from the command table 210 according to the order in which they were stored in the command table 210 (e.g., according to the order of tag allocation), analyzes the operation code (opcode) of each of the individual commands, and can classify each individual command as being a M2H type of command (e.g., read command type), where data transfer happens from the memory sub-system 204 to the host system 202, or a H2M type of command (e.g., write command type), where data transfer happens from the host system 202 to the memory sub-system 204. Accordingly, when the memory sub-system 204 is handling a read workload, the command table 210 can be primarily occupied by M2H commands. When the memory sub-system 204 is handling a write workload, the command table 210 can be primarily occupied by H2M commands.

The command table analyzer 224 implements one or more features of various embodiments described herein. Depending on the embodiment, the command table analyzer 224 can comprise firmware that is a part of the command handler 212. The command table analyzer 224 can maintain a M2H command counter (e.g., read command counter) and H2M command counter (e.g., write command counter) and use the two counters to analyze the command table 210. For some embodiments, the command table analyzer 224 analyzes the command table 210 to determine a future or upcoming command pattern (e.g., read or write command pattern) and use this determination to control (e.g., via the engine controller 226) if and when to enable (e.g., turn on) and disable (e.g., turn off) at least one of the write engine 214 or the read engine 216 of the memory sub-system 204. Additionally, for some embodiments, the command table analyzer 224 considers a latency time parameter in determining whether to enable or disable the write engine 214, the read engine 216, or both, which can help in reducing or eliminating any latency resulting from the enabling or disabling of engines. Accordingly, the command table analyzer 224 can enable the memory sub-system 204 to selectively enable or disable the write engine 214 or the read engine 216 based on a sequence of (consecutive) M2H commands (e.g., read commands), or a sequence of (consecutive) H2M commands (e.g., write commands), observed in the command table 210 (by the command table analyzer 224) as being queued next for retrieval for execution by the command handler 212. Additionally, the command table analyzer 224 can enable the memory sub-system 204 to selectively enable or disable the write engine 214 or the read engine 216 while reducing or eliminating a latency impact caused by the enabling/disabling of the write engine 214 or the read engine 216. Examples of how the command table analyzer 224 analyzes commands in the command table 210 and enables/disables the write engine 214 or the read engine 216 are illustrated by the example methods of FIGS. 3-9.

For some embodiments, the command table analyzer 224 facilitates the enabling or disabling of the write engine 214, the read engine 216, or both by instructing or triggering the engine controller 226 accordingly. Based on an instruction or a signal from the command table analyzer 224, the engine controller 226 can individually signal or instruct the write engine 214, the read engine 216, or both to enable or disable itself. For some embodiments, prior to disabling the write engine 214 (based on an instruction/signal from the command table analyzer 224), the engine controller 226 determines a status of the write engine 214 via a status signal from the write engine 214. If the status indicates that the write engine 214 is busy, the disablement of the write engine 214 can be deferred for another time when the status indicates that the write engine 214 is no longer busy. Additionally, for some embodiments, prior to disabling the read engine 216 (based on an instruction/signal from the command table analyzer 224), the engine controller 226 determines a status of the read engine 216 via a status signal from the read engine 216. If the status indicates that the read engine 216 is busy, the disablement of the read engine 216 can be deferred for another time when the status indicates that the read engine 216 is no longer busy.

For some embodiments, the engine controller 226 enables or disables the write engine 214 by enabling or disabling one or more components (e.g., hardware IP and circuitry) associated with the write engine 214. For instance, the engine controller 226 can specifically enable or disable only those components of the write engine 214 that are not shared with the read engine 216, such as the H2M DMA 250 component, the intermediate data buffer 252, and the encryption/compression 254 component. To enable or disable the write engine 214, the engine controller 226 identifies the one or more components associated with the write engine 214 based on mapping data that describes (e.g., maps) those components for the write engine 214. Similarly, the engine controller 226 enables or disables the read engine 216 by enabling or disabling one or more components (e.g., hardware IP and circuitry) associated with the read engine 216. For instance, the engine controller 226 can specifically enable or disable only those components of the read engine 216 that are not shared with the write engine 214, such as the decryption/decompression 264 component, the intermediate data buffer 262, and the M2H DMA 260 component. To enable or disable the read engine 216, the engine controller 226 identifies the one or more components associated with the read engine 216 based on mapping data that describes (e.g., maps) those components for the read engine 216.

For illustrative purposes, assume that in one use case the command table 210 is storing a sequence of 200 read commands issued by the host system 202, and 50 of those read commands have already been retrieved from the command table 210 (e.g., by the command handler 212) and are being executed using the read engine 216. The command table analyzer 224 can iterate over the command table 210 in the order in which tags got allocated to commands in the command table 210. Based on this iteration, the command table analyzer 224 can determine that the next sequence of commands to be retrieved from the command table 210 are a sequence of 150 read commands (which represent the remaining 150 commands of the original 200 read commands) followed by at least one write command. In anticipation of the write engine 214 being idle and unused while the sequence of 150 read commands are retrieved (e.g., in small portions) from the command table 210 and executed using the read engine 216, the command table analyzer 224 can determine and cause the write engine 214 to be disabled. Eventually, when the command table analyzer 224 determines that at least one write command is next to be retrieved from the command table 210 for execution (or determines that the at least one write command will be next within a certain amount of time in view of a latency time parameter), the command table analyzer 224 can determine and cause the write engine 214 to be reenabled. Additionally, at least one write command is determined to be next to be retrieved from the command table 210 for execution, the command table analyzer 224 can determine that the next sequence of commands to be retrieved from the command table 210, and determine whether the sequence of write commands is of at least a certain length (e.g., number of write commands is greater than a write command threshold) that would make it beneficial for the command table analyzer 224 to disable the read engine 216 (as it remains idle and unused during processing of the sequence of write commands). For instance, the write command threshold can be set to 50, and the sequence of write commands can comprise 100 write commands followed by at least one read command. The write command threshold can be set by a user of the memory sub-system 204. A similar threshold (e.g., read command threshold) can be used for determining when to disable the write engine 214, and can be set by the user of the memory sub-system 204.

FIGS. 3 through 9 are flow diagrams of example methods for using analysis of a sequence of commands to manage a memory command engine (e.g., a read engine or a write engine) of a memory system, in accordance with some embodiments of the present disclosure. The methods 300, 400, 500, 600, 700, 800, 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 300, 400, 500, 600, 700, 800, 900 is performed by the memory sub-system controller 115 of FIG. 1 based on the memory command engine manager 112. Additionally. or alternatively, for some embodiments, at least one of the methods 300, 400, 500, 600, 700, 800, 900 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Figure 3:
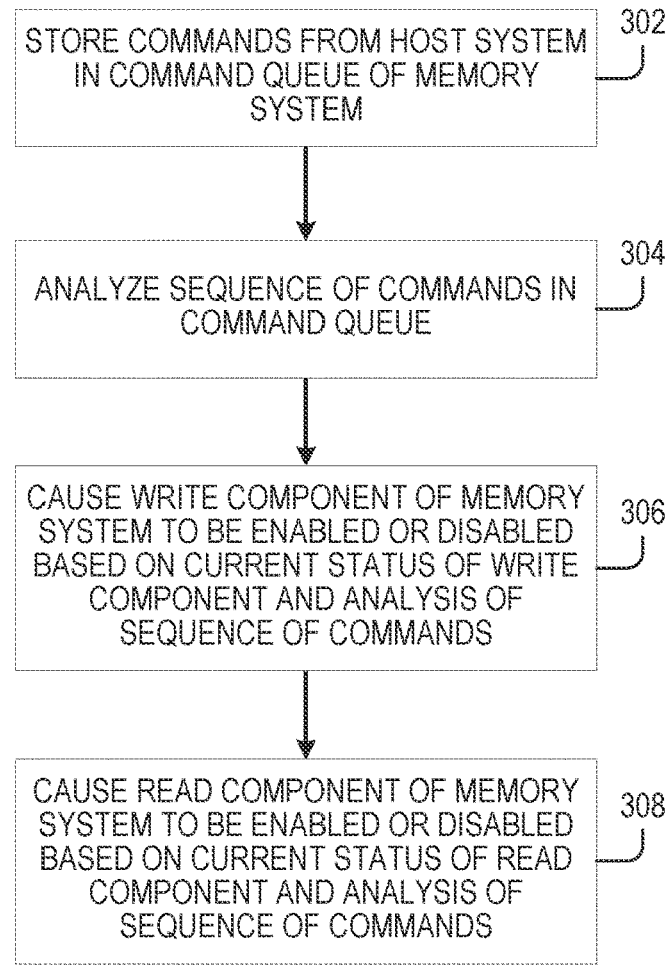
FIGS. 3 through 9 are flow diagrams of example methods for using analysis of a sequence of commands to manage a memory command component (e.g., a read engine or a write engine) of a memory system, in accordance with some embodiments of the present disclosure.

Referring now to the method 300 of FIG. 3, for some embodiments, the method 300 represents a method for using analysis of a sequence of commands to manage a memory command component (e.g., engine), such as a read engine or a write engine of a memory system. At operation 302, a processing device (e.g., the processor 117 of the memory sub-system controller 115) stores commands, received from a host system (e.g., 120), in a command queue of a memory system (e.g., 110). The host system (e.g., 120) generates commands for the memory system (e.g., 110), and those commands can be sent to the memory system (e.g., 110) or retrieved (e.g., fetched) from the host system (e.g., from a queue on the host system) by the memory system. For some embodiments, the command queue comprises a command table (e.g., 210), where each command is stored in the command table in association with an individual tag. For some such embodiments, the order in which commands are received by the memory sub-system (e.g., 110) determines the order in which commands are retrieved from the command table and executed and, thus, determines when a sequence of commands of a single command type (e.g., read command type or write command type) exists in the command table.

For various embodiments, while one or more commands (e.g., read and write commands) are being retrieved from the command queue for execution (e.g., by the processing device), operations 304 through 308 are performed. For instance, as one or more commands are being retrieved from the command queue for execution, operations 304 through 308 can be performed in response a condition (e.g., a read or write command being newly stored in the command table 210) or performed on a periodic basis (e.g., based on a time interval).

At operation 304, the processing device (e.g., 117) analyzes (e.g., observes), in the command queue, a sequence of commands of a same command type (e.g., M2H/read command type or D2H/write command type), where the sequence of commands is queued next to be retrieved from the command queue for execution (on a memory device 130 of the memory sub-system 110) by a read component (e.g., 114) or a write component (e.g., 113) of the memory system (e.g., 110). For some embodiments, analyzing the sequence of commands (of the same command type) in the command queue comprises iterating through the command queue according to the order in which tags are allocated (e.g., associated) to commands in the command queue (e.g., command table). During the iteration, the processing device can classify the command type (e.g., read command type or write command type) of each command based on an opcode of the command.

Based on analysis of the sequence of commands (at operation 304) and a current status of a write component (e.g., 113), the processing device (e.g., 117) causes the write component (e.g., 113) of the memory system to be enabled or disabled at operation 306. For some embodiments, performance of operations 302, 304, and 306 is illustrated by the methods 400 and 500 of FIGS. 4 and 5. Additionally, based on analysis of the sequence of commands (at operation 304) and a current status of a read component (e.g., 113), the processing device (e.g., 117) causes the read component of the memory system to be enabled or disabled at operation 308. For some embodiments, performance of operations 302, 304, and 308 is illustrated by the methods 600 and 700 of FIGS. 6 and 7.

Figure 4:
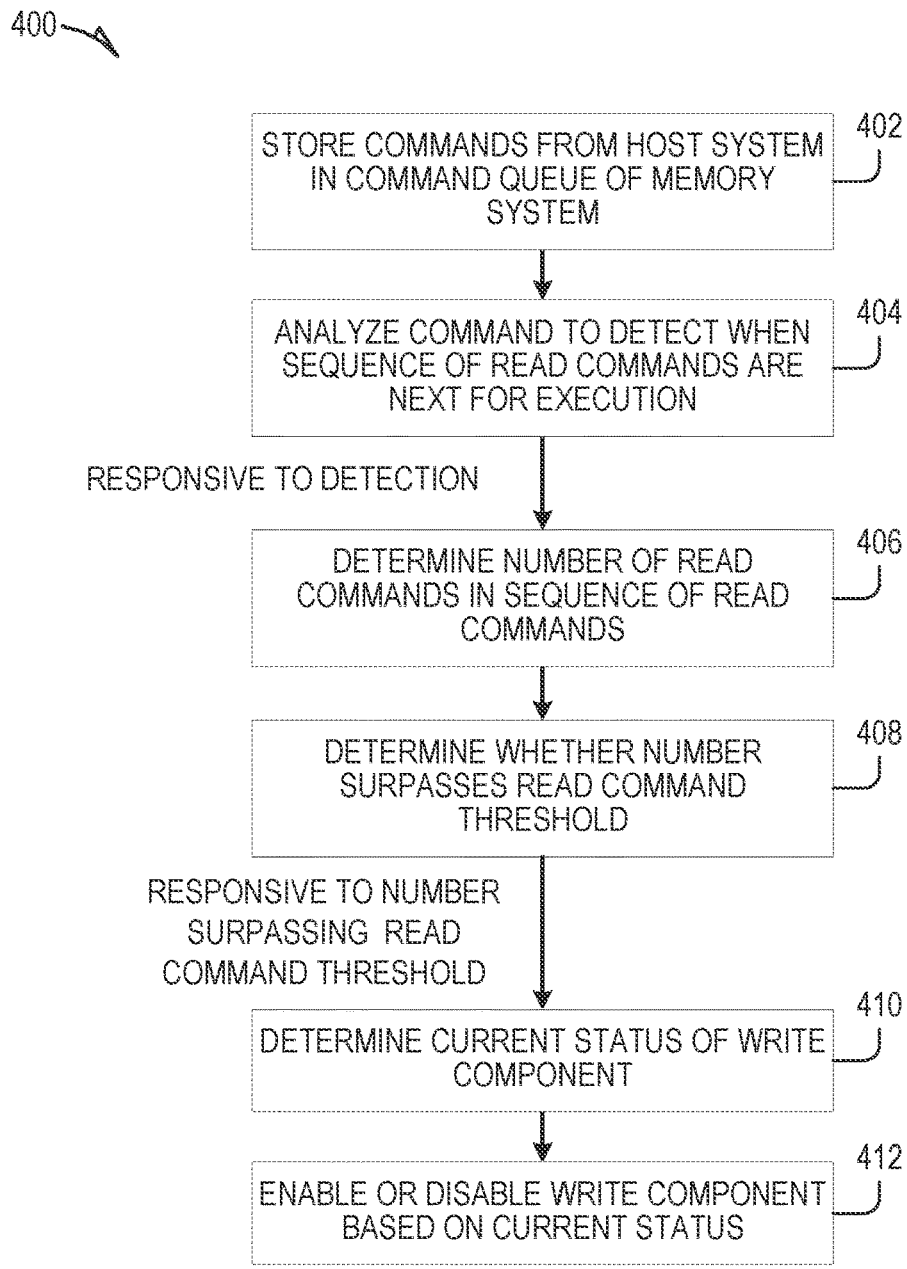

Referring now to the method 400 of FIG. 4, for some embodiments, the method 400 represents a method for using analysis of a sequence of commands to manage a write component (e.g., engine) of a memory system. At operation 402, a processing device (e.g., the processor 117 of the memory sub-system controller 115) stores commands, received from a host system (e.g., 120), in a command queue of a memory system (e.g., 110). For some embodiments, operation 402 is similar to operation 302 of the method 300 described with respect to FIG. 3.

For various embodiments, while one or more commands (e.g., read and write commands) are being retrieved from the command queue for execution (e.g., by the processing device), operations 404 through 412 are performed. For instance, as one or more commands are being retrieved from the command queue for execution, operations 404 through 412 can be performed in response a condition (e.g., a read or write command being newly stored in the command table 210) or performed on a periodic basis (e.g., based on a time interval).

The processing device (e.g., 117), at operation 404, analyzes the command queue to detect when a sequence of read commands are queued next to be retrieved from the command queue for execution by a read component (e.g., 114) of the memory system (e.g., 110). The analyzing the command queue (to detect when the sequence of read commands are queued next to be retrieved from the command queue) comprises iterating through the command queue according to an order in which tag allocation order.

In response to detecting the sequence of read commands, at operation 406, the processing device (e.g., 117) determines a number of read commands in the sequence of read commands and, at operation 408, determines whether the number of read commands surpasses (e.g., is greater than) a read command threshold. Depending on the embodiment, the read command threshold can be set by a manufacturer of the memory system or a user of the memory system. Additionally, the read command threshold can be determined based on (e.g., the manufacturer or user) testing and tuning the memory system.

In response to determining that the number of read command surpasses the read command threshold, at operation 410, the processing device (e.g., 117) determines a current status of a write component (e.g., 113) of the memory system. An example of a status of the write component can include, without limitation, enabled (e.g., activated or on) or disabled (e.g., deactivated or off), where when the write component is enabled, the status of the write component can further be busy (e.g., operating) or idle. The processing device (e.g., 117), at operation 412, enables or disables the write component (e.g., 113) based on the current status of the write component. For instance, the processing device can enable or disable the write component based on the current status of the write component by determining whether the current status of the write component indicates that the write component is idle (e.g., enabled and not busy) and, in response to the current status indicating that the write component is idle, disabling the write component. In response to the current status indicating that the write component is not idle, the processing device can disable the write component after the current status of the write component changes to indicate that the write component is idle. Alternatively, in response to the current status indicating that the write component is not idle, the processing device can redetermine the number of the sequence of read commands (since they may have changed since it was last determined at operation 408) and, in response to determining that the number (as redetermined) surpasses the read command threshold, redetermining the current status of the write component and enabling or disabling the write component based on the current status of the write component as redetermined.

For some embodiments, disabling the write component can comprise disabling sub-components (e.g., sub-components not shared by the read component) associated with the write component. As described herein, the processing device can enable or disable the write component by enabling or disabling sub-components of the write component based on mapping data that describes sub-components associated with the write component. Depending on the embodiment, the mapping data can be stored on the memory system (e.g., the local memory 119) by the manufacturer of the memory system.

Figure 5:
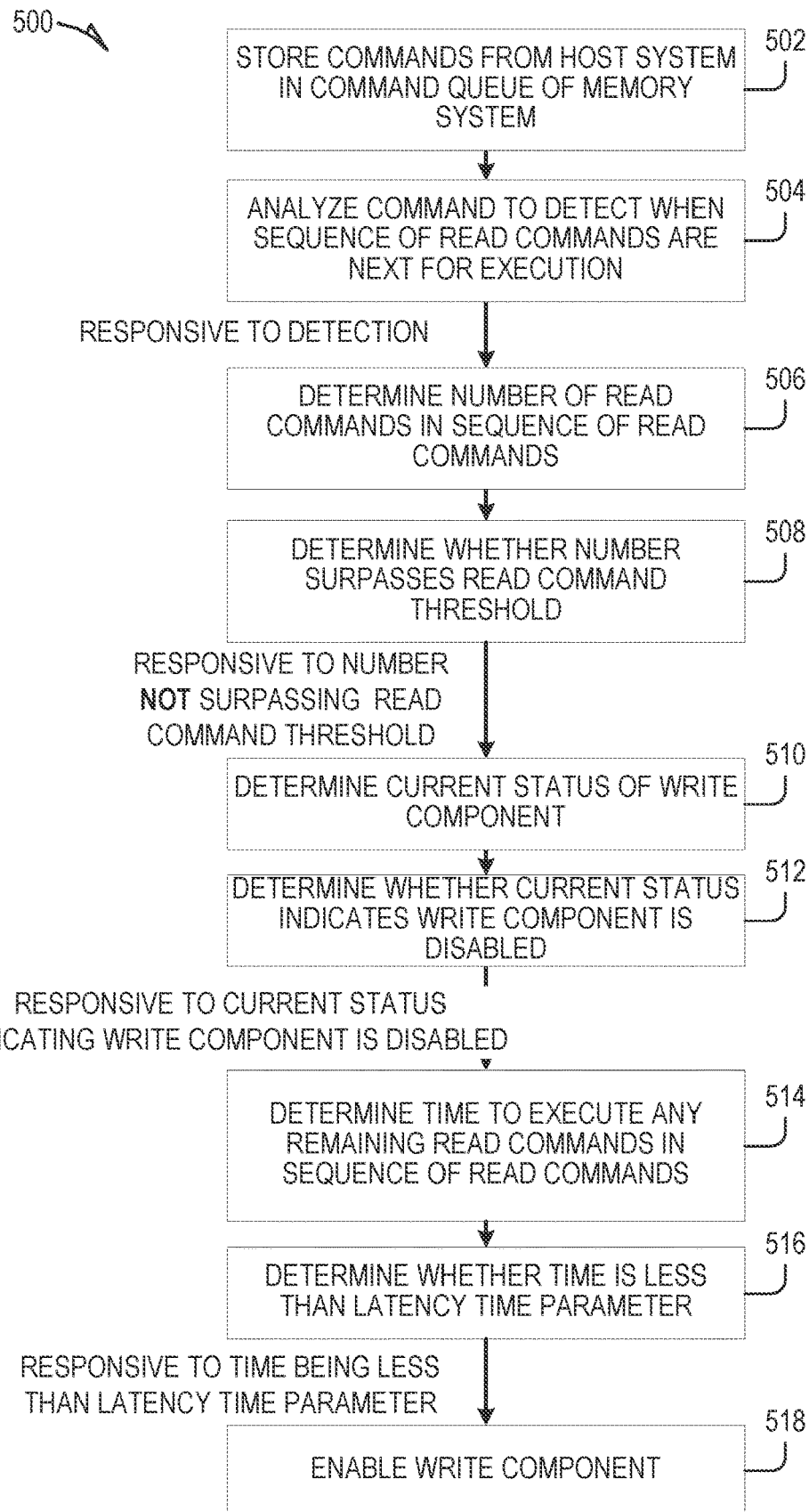

Referring now to the method 500 of FIG. 5, for some embodiments, the method 500 represents a method for using analysis of a sequence of commands to manage a write component (e.g., engine) of a memory system. For some embodiments, operations 502, 504, 506, 508 are respectively similar to operations 402, 404, 406, 408 of the method 400 described with respect to FIG. 4. In response to determining that the number of read commands does not surpass (e.g., is not greater than) the read command threshold, at operation 510, the processing device (e.g., 117) determines a current status of the write component (e.g., 113) of the memory system. Subsequently, at operation 512, the processing device (e.g., 117) determines whether the current status of the write component (e.g., 113) indicates that the write component is disabled (e.g., off).

According to various embodiments, the processing device (e.g., 117) does nothing in response to the current status of the write component indicating that the write component is not disabled (i.e., enabled). However, in response to determining that the current status of the write component indicates that the write component is disabled, at operation 514, the processing device (e.g., 117) determines a time to execute (e.g., estimated time for the memory system to execute) any remaining read commands in the sequence of read commands and, at operation 516, the processing device determines whether the (determined) time to execute is less than a latency time parameter.

For some embodiments, the processing device (e.g., 117) does nothing in response to the time to execute not being less than a latency time parameter. However, in response to the time to execute being less than a latency time parameter, the processing device (e.g., 117) enables the write component (e.g., 113) at operation 518. By enabling the write component based on the latency time parameter in this manner, various embodiments can reduce or eliminate a latency impact of the write component being disabled when a write command is eventually retrieved from the command queue for execution.

Depending on the embodiment, the latency time parameter is one set by a manufacturer of the memory system or a user of the memory system. Additionally, the latency time parameter can be determined based on (e.g., the manufacturer or user) testing and tuning the memory system. The latency time parameter used for the write component and the method 500 can be different from a latency time parameter used for a read component (and the method 700 of FIG. 7).

Figure 6:
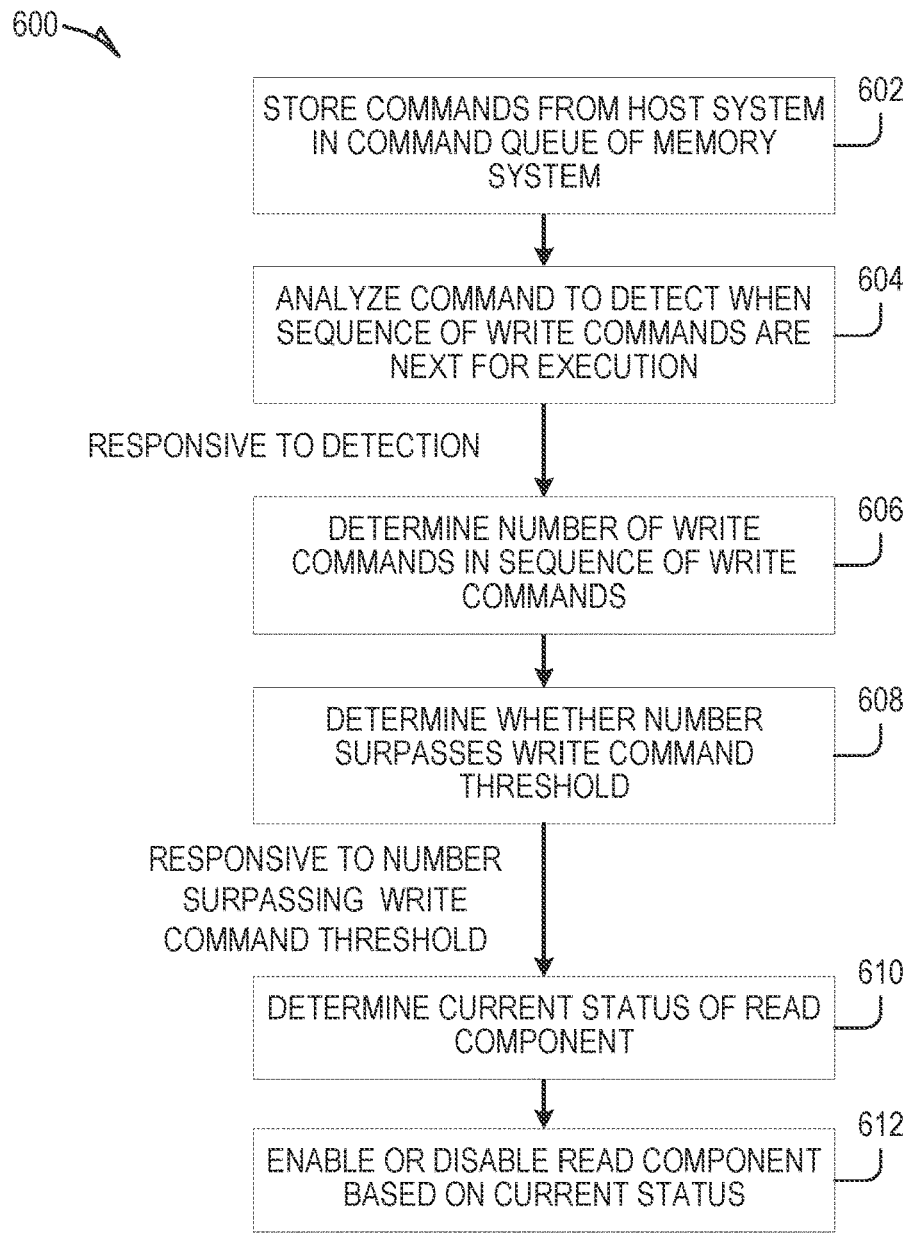

Referring now to the method 600 of FIG. 6, for some embodiments, the method 600 represents a method for using analysis of a sequence of commands to manage a read component (e.g., engine) of a memory system. At operation 602, a processing device (e.g., the processor 117) stores commands, received from a host system (e.g., 120), in a command queue of a memory system (e.g., 110). For some embodiments, operation 602 is similar to operation 402 of the method 400 described with respect to FIG. 4.

For various embodiments, while one or more commands (e.g., read and write commands) are being retrieved from the command queue for execution (e.g., by the processing device), operations 604 through 612 are performed. For instance, as one or more commands are being retrieved from the command queue for execution, operations 604 through 612 can be performed in response a condition (e.g., a read or write command being newly stored in the command table 210) or performed on a periodic basis (e.g., based on a time interval).

The processing device (e.g., 117), at operation 604, analyzes the command queue to detect when a sequence of write commands are queued next to be retrieved from the command queue for execution by a write component (e.g., 113) of the memory system (e.g., 110). The analyzing the command queue (to detect when the sequence of write commands are queued next to be retrieved from the command queue) comprises iterating through the command queue according to tag allocation order.

In response to detecting the sequence of write commands, at operation 606, the processing device (e.g., 117) determines a number of write commands in the sequence of write commands and, at operation 608, determines whether the number of write commands surpasses (e.g., is greater than) a write command threshold. Depending on the embodiment, the write command threshold can be set by a manufacturer of the memory system or a user of the memory system. Additionally, the write command threshold can be determined based on (e.g., the manufacturer or user) testing and tuning the memory system.

In response to determining that the number of write commands surpasses the write command threshold, at operation 610, the processing device (e.g., 117) determines a current status of a read component (e.g., 114) of the memory system. An example of a status of the read component can include, without limitation, enabled (e.g., activated or on) or disabled (e.g., deactivated or off), where when the read component is enabled, the status of the read component can further be busy (e.g., operating) or idle. The processing device (e.g., 117), at operation 612, enables or disables the read component (e.g., 114) based on the current status of the read component. For instance, the processing device can enable or disable the read component based on the current status of the read component by determining whether the current status of the read component indicates that the read component is idle (e.g., enabled and not busy) and, in response to the current status indicating that the read component is idle, disabling the read component. In response to the current status indicating that the read component is not idle, the processing device can disable the read component after the current status of the read component changes to indicate that the read component is idle. Alternatively, in response to the current status indicating that the read component is not idle, the processing device can redetermine the number of the sequence of write commands (since they may have changed since it was last determined at operation 608)

and, in response to determining that the number (as redetermined) surpasses the write command threshold, redetermining the current status of the read component and enabling or disabling the read component based on the current status of the read component as redetermined.

For some embodiments, disabling the read engine can comprise disabling sub-components (e.g., sub-components not shared by the read component) associated with the read component. As described herein, the processing device can enable or disable the read component by enabling or disabling sub-components of the read component based on mapping data that describes sub-components associated with the read engine. Depending on the embodiment, the mapping data can be stored on the memory system (e.g., the local memory 119) by the manufacturer of the memory system.

Figure 7:
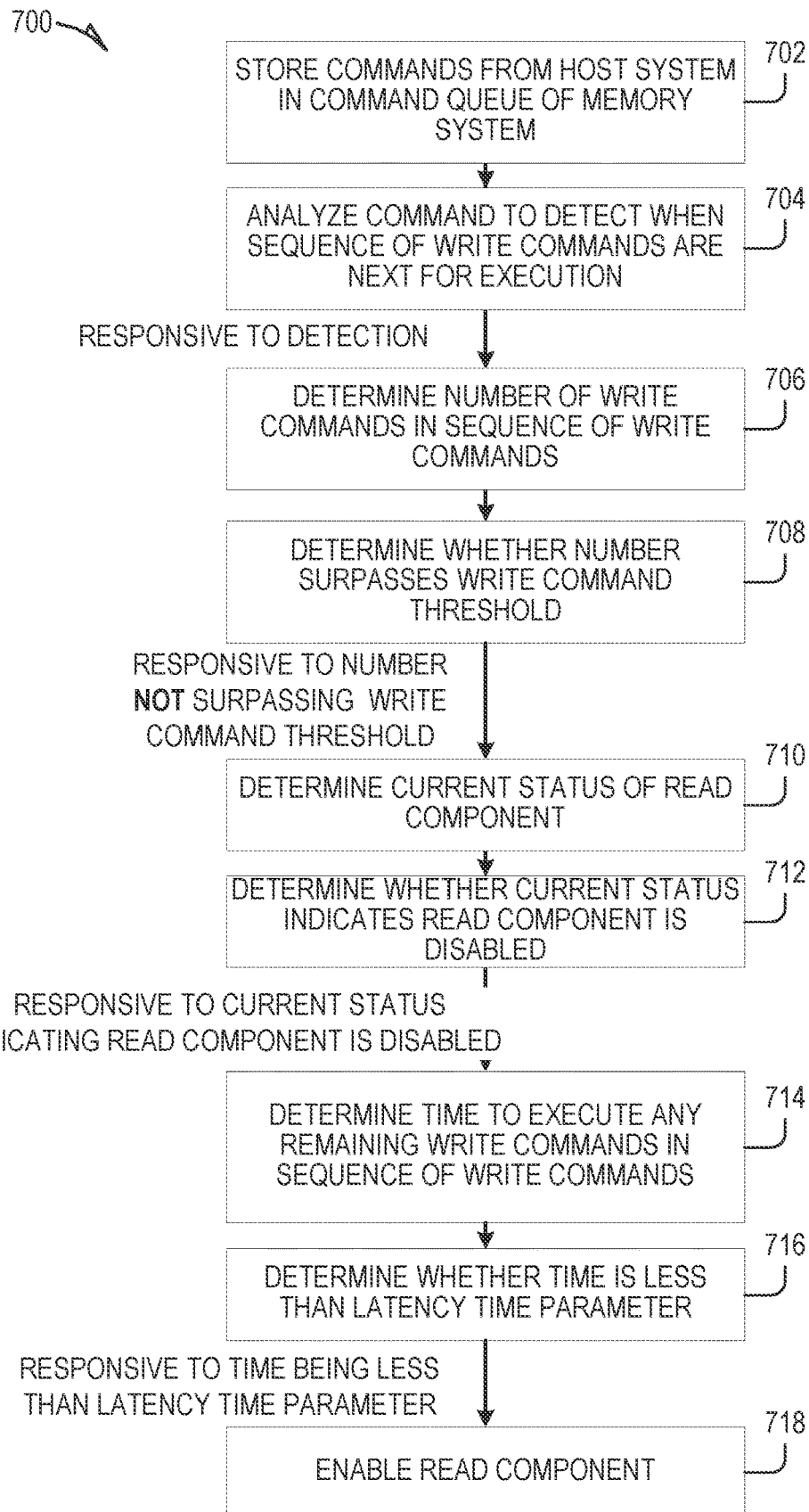

Referring now to the method 700 of FIG. 7, for some embodiments, the method 700 represents a method for using analysis of a sequence of commands to manage a read component (e.g., engine) of a memory system. For some embodiments, operations 702, 704, 706, 708 are respectively similar to operations 602, 604, 606, 608 of the method 600 described with respect to FIG. 6. In response to determining that the number of write commands does not surpass (e.g., is not greater than) the write command threshold, at operation 710, the processing device (e.g., 117) determines a current status of the read component (e.g., 114) of the memory system. Subsequently, at operation 712, the processing device (e.g., 117) determines whether the current status of the read component (e.g., 114) indicates that the read component is disabled (e.g., off).

According to various embodiments, the processing device (e.g., 117) does nothing in response to the current status of the read component indicating that the read component is not disabled (i.e., enabled). However, in response to determining that the current status of the read component indicates that the read component is disabled, at operation 714, the processing device (e.g., 117) determines a time to execute (e.g., estimated time for the memory system to execute) any remaining write commands in the sequence of write commands and, at operation 716, the processing device determines whether the (determined) time to execute is less than a latency time parameter.

For some embodiments, the processing device (e.g., 117) does nothing in response to the time to execute not being less than a latency time parameter. However, in response to the time to execute being less than a latency time parameter, the processing device (e.g., 117) enables the read component (e.g., 114) at operation 718. By enabling the read component based on the latency time parameter in this manner, various embodiments can reduce or eliminate a latency impact of the read component being disabled when a write command is eventually retrieved from the command queue for execution.

Depending on the embodiment, the latency time parameter is one set by a manufacturer of the memory system or a user of the memory system. Additionally, the latency time parameter can be determined based on (e.g., the manufacturer or user) testing and tuning the memory system. The latency time parameter used for the read component and the method 700 can be different from a latency time parameter used for a write component (and the method 500 of FIG. 5).

Figure 8:
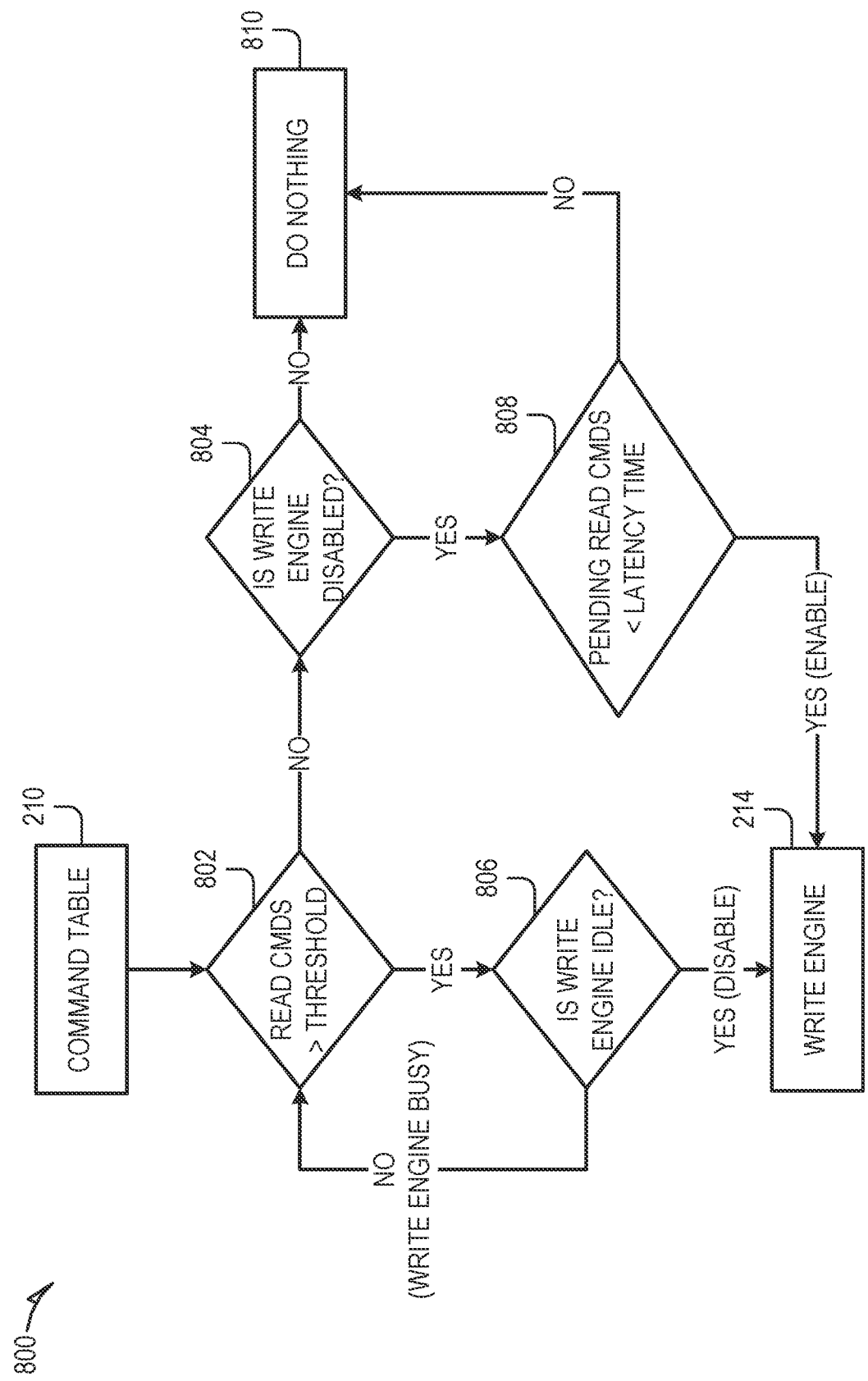

Referring now to the method 800 of FIG. 8, for some embodiments, the method 800 represents a method for using analysis of a sequence of read commands to manage the write engine 214 of a memory system. At operation 802, a processing device (e.g., the processor 117) determines whether a number of read commands, in a sequence of read commands in the command table 210, is greater than a read command threshold. If the processing device (e.g., 117) determines that the number is greater than the read command threshold, the method 800 proceeds to operation 806; otherwise the method 800 proceeds to operation 804.

The processing device (e.g., 117), at operation 806, determines whether a write engine 214 of the memory system is idle. If the processing device (e.g., 117) determines that the write engine 214 is idle (at operation 806), the processing device causes the write engine 214 to be disabled; otherwise the method 800 returns to operation 802 (e.g., because the write engine 214 is busy).

At operation 804, the processing device (e.g., 117) determines whether the write engine 214 is disabled (e.g., off). If the processing device (e.g., 117) determines that the write engine 214 is disabled, the method 800 proceeds to operation 808; otherwise the processing device does nothing (810). The processing device (e.g., 117), at operation 808, determines whether a time (e.g., estimated time) for executing pending (e.g., remaining) read commands from the command table 210 is less than a latency time parameter (e.g., zero latency time parameter). If the processing device (e.g., 117) determines that the time is less than the latency time parameter (at operation 808), the processing device causes the write engine 214 to be enabled; otherwise the processing device does nothing (810).

Figure 9:
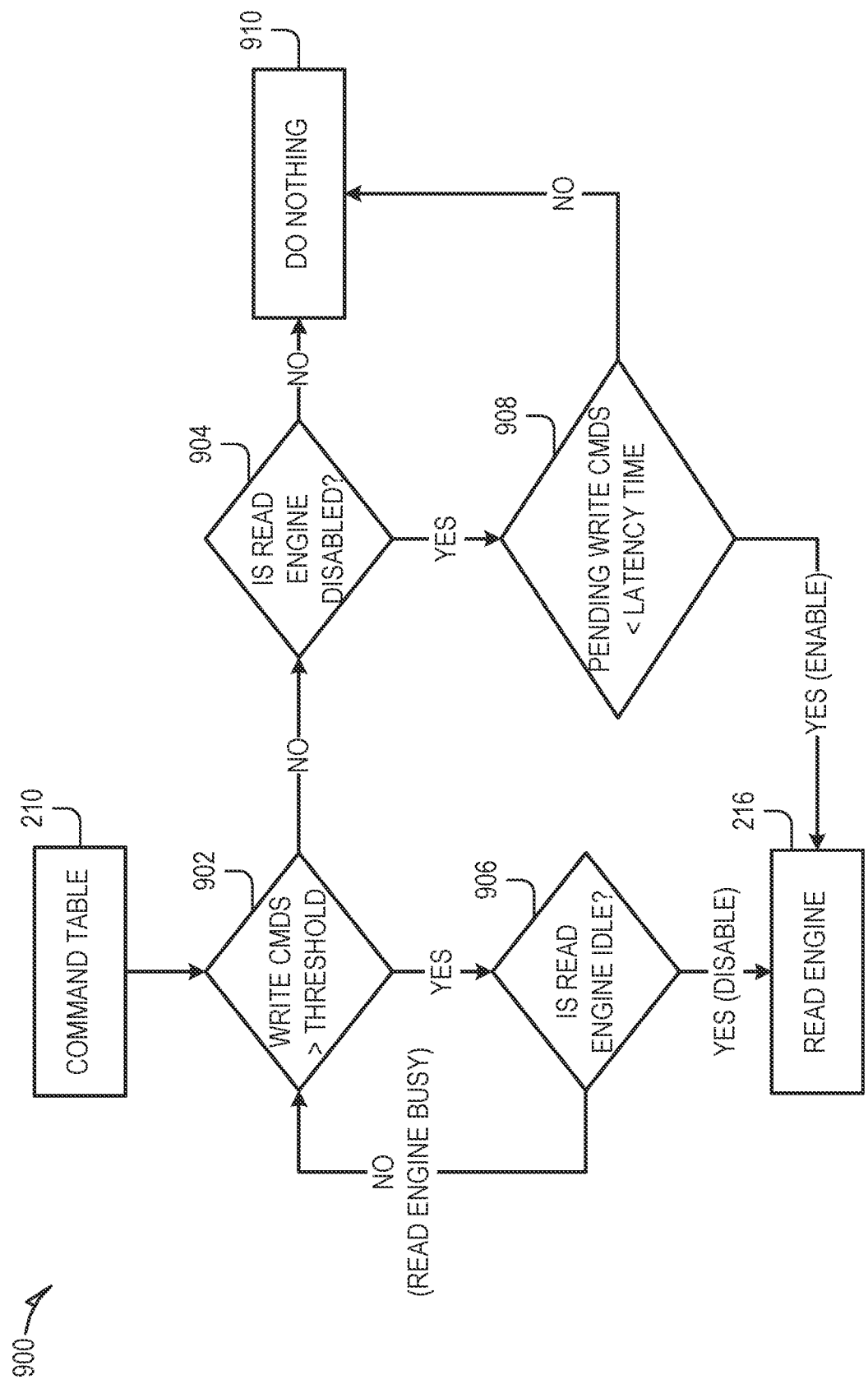

Referring now to the method 900 of FIG. 9, for some embodiments, the method 900 represents a method for using analysis of a sequence of write commands to manage the read engine 216 of a memory system. At operation 902, a processing device (e.g., the processor 117) determines whether a number of write commands, in a sequence of write commands in the command table 210, is greater than a write command threshold. If the processing device (e.g., 117) determines that the number is greater than the write command threshold, the method 900 proceeds to operation 906; otherwise the method 900 proceeds to operation 904.

The processing device (e.g., 117), at operation 906, determines whether a read engine 216 of the memory system is idle. If the processing device (e.g., 117) determines that the read engine 216 is idle (at operation 906), the processing device causes the read engine 216 to be disabled; otherwise the method 900 returns to operation 902 (e.g., because the read engine 216 is busy).

At operation 904, the processing device (e.g., 117) determines whether the read engine 216 is disabled (e.g., off). If the processing device (e.g., 117) determines that the read engine 216 is disabled, the method 900 proceeds to operation 908; otherwise the processing device does nothing (910). The processing device (e.g., 117), at operation 908, determines whether a time (e.g., estimated time) for executing pending (e.g., remaining) write commands from the command table 210 is less than a latency time parameter (e.g., zero latency time parameter). If the processing device (e.g., 117) determines that the time is less than the latency time parameter (at operation 908), the processing device causes the read engine 216 to be enabled; otherwise the processing device does nothing (910).

Figure 10:
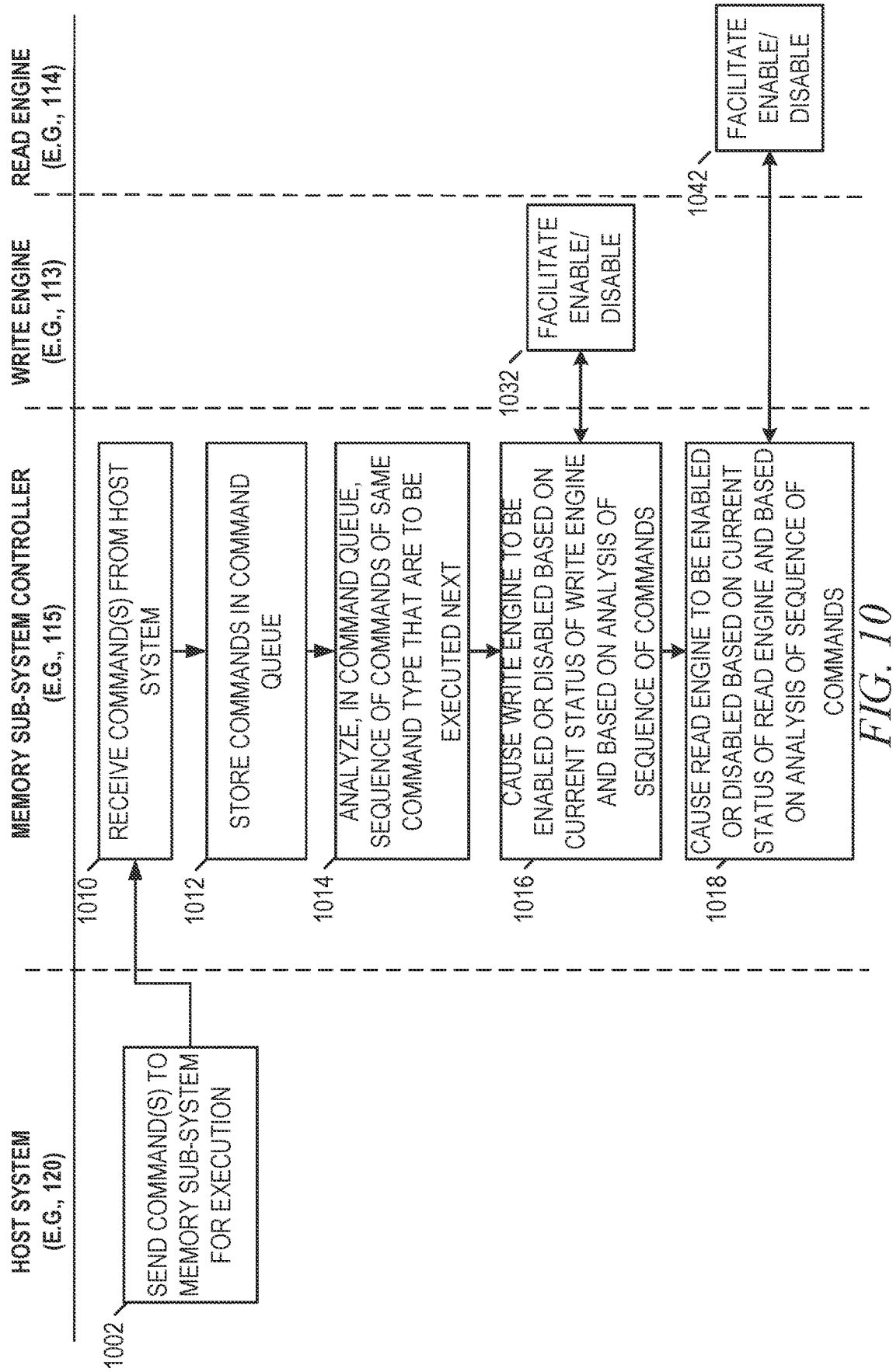
FIG. 10 provides an interaction diagram illustrating interactions between components of a computing environment in the context of some embodiments in which a method for using analysis of a sequence of commands to manage a memory command component, as described herein, is performed.

FIG. 10 provides an interaction diagram illustrating interactions between components of a computing environment in the context of some embodiments in which a method for using analysis of a sequence of commands to manage a memory command component (e.g., engine), as described herein, is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a write component (e.g., 113), a read component (e.g., 114), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. In the context of the example illustrated in FIG. 10, the host system can include the host system 120, the memory sub-system controller can include the memory sub-system controller 115, the write component can include the write engine 113, and the read component can include the read engine 114.

As shown, at operation 1002, the host system 120 sends one or more commands to the memory sub-system 110. At operation 1010, the memory sub-system controller 115 receives the one or more commands from the host system 120.

The memory sub-system controller 115, at operation 1012, stores the one or more commands in a command queue of the memory sub-system 110. Subsequently, at operation 1014, the memory sub-system controller 115 analyzes, in the command queue, a current sequence of commands of a same command type that are to be executed next by the memory sub-system controller 115. Based on analysis of the sequence of commands (at operation 1014) and a current status of the write engine 113, the memory sub-system controller 115 causes the write engine 113 to be enabled or disabled at operation 1016. At operation 1032, the write engine 113 responds to the memory sub-system controller 115 by facilitating its enablement or disablement accordingly. Based on analysis of the sequence of commands (at operation 1014) and a current status of the read engine 114, the memory sub-system controller 115 causes the read engine 114 to be enabled or disabled at operation 1018. At operation 1042, the read engine 114 responds to the memory sub-system controller 115 by facilitating its enablement or disablement accordingly.

Figure 11:
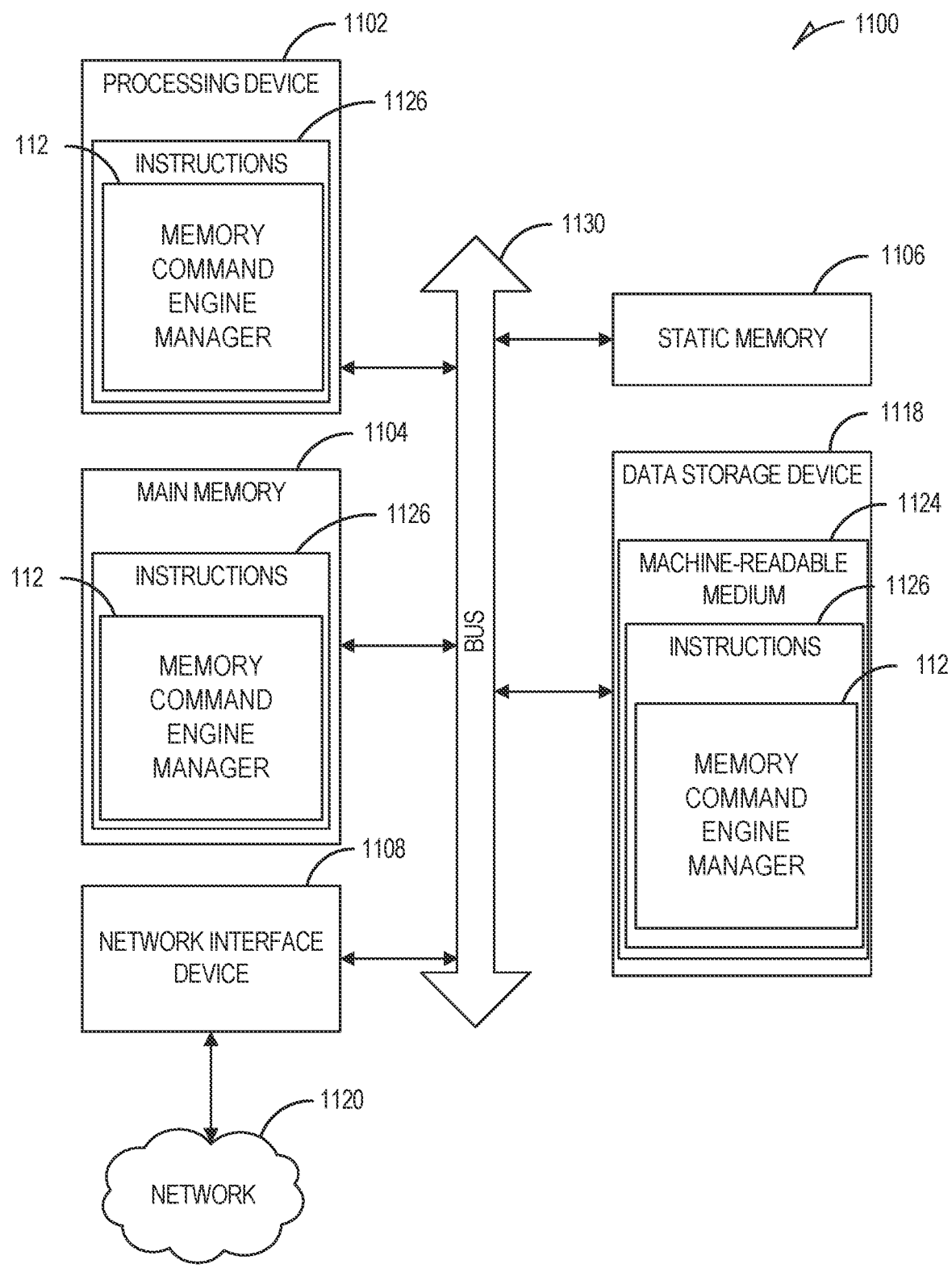
FIG. 11 is a block diagram of an example computer system in which embodiments of the present disclosure may operate.

FIG. 11 illustrates an example machine in the form of a computer system 1100 within which a set of instructions can be executed for causing the machine to perform any one or more of the methodologies discussed herein. In some embodiments, the computer system 1100 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., ROM, flash memory, DRAM such as SDRAM or Rambus DRAM (RDRAM), etc.), a static memory 1106 (e.g., flash memory, static random access memory (SRAM), etc.), and a data storage device 1118, which communicate with each other via a bus 1130.

The processing device 1102 represents one or more general-purpose processing devices such as a microprocessor, a central processing unit, or the like. More particularly, the processing device 1102 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1102 can also be one or more special-purpose processing devices such as an ASIC, a FPGA, a digital signal processor (DSP), a network processor, or the like. The processing device 1102 is configured to execute instructions 1126 for performing the operations and steps discussed herein. The computer system 1100 can further include a network interface device 1108 to communicate over a network 1120.

The data storage device 1118 can include a machine-readable storage medium 1124 (also known as a computer-readable medium) on which is stored one or more sets of instructions 1126 or software embodying any one or more of the methodologies or functions described herein. The instructions 1126 can also reside, completely or at least partially, within the main memory 1104 and/or within the processing device 1102 during execution thereof by the computer system 1100, the main memory 1104 and the processing device 1102 also constituting machine-readable storage media. The machine-readable storage medium 1124, data storage device 1118, and/or main memory 1104 can correspond to the memory sub-system 110 of FIG. 1.

In one embodiment, the instructions 1126 include instructions to implement functionality corresponding to using analysis of a sequence of commands to manage a write component (e.g., engine) of a memory system as described herein (e.g., the memory command engine manager 112 of FIG. 1). While the machine-readable storage medium 1124 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs. and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device;
   a write component to write data to the memory device;
   a read component to read data from the memory device; and
   a processing device, operably coupled to the memory device, configured to perform operations comprising:
   storing, in a command queue of the system, commands received from a host system; and
   while one or more commands are being retrieved from the command queue for execution:
   analyzing the command queue to detect when a sequence of read commands are queued next to be retrieved from the command queue for execution by the read component; and
   in response to detecting the sequence of read commands:
   determining a number of read commands in the sequence of read commands;
   determining whether the number surpasses a read command threshold; and
   in response to determining that the number surpasses the read command threshold:
   determining whether a current status of the write component indicates that the write component is idle; and
   at least one of:
   in response to determining that the current status of the write component indicates that the write component is idle, disabling the write component; or
   in response to determining that the current status of the write component indicates that the write component is not idle, disabling the write component after the current status of the write component changes to indicate that the write component is idle.

2. The system of claim 1, wherein the analyzing the command queue to detect when the sequence of read commands are queued next to be retrieved from the command queue for execution by the read component comprises:
   iterating through the command queue according to an order in which the one or more commands are stored in the command queue.

3. The system of claim 2, wherein the command queue comprises a command table, each command is stored in the command table in association with a tag, and the order is determined based on an order in which tags are allocated to commands stored in the command table.

4. The system of claim 1, wherein the disabling of the write component comprises disabling components of the write component based on mapping data that describes components associated with the write component.

5. The system of claim 1, wherein the operations comprise:
   in response to determining that the number does not surpass the read command threshold:
   determining a current status of the write component;
   determining whether the current status of the write component indicates that the write component is disabled; and
   in response to determining that the current status of the write component indicates that the write component is disabled:
   determining a time to execute any remaining read commands in the sequence of read commands;
   determining whether the time to execute is less than a latency time parameter; and in response to determining that the time to execute is less than the latency time parameter, enabling the write component.

6. The system of claim 5, wherein the latency time parameter is user-defined.

7. The system of claim 1, wherein the read command threshold is user-defined.

8. The system of claim 1, wherein the processing device is part of a memory sub-system controller of the system, and the command queue is stored in a local memory of the memory sub-system controller.

9. A method comprising:
storing, in a command queue of a memory system, commands received from a host system; and
while one or more commands are being retrieved from the command queue for execution:
analyzing the command queue to detect when a sequence of write commands are queued next to be retrieved from the command queue for execution by a write component of a memory system; and
in response to detecting the sequence of write commands:
determining a number of write commands in the sequence of write commands;
determining whether the number surpasses a write command threshold; and
in response to determining that the number surpasses the write command threshold:
determining whether a current status of a read component of the memory system indicates that the read component is idle; and
in response to determining that the current status of the read component indicates that the read component is idle, disabling the read component.

10. The method of claim 9, wherein the analyzing the command queue to detect when the sequence of write commands are queued next to be retrieved from the command queue for execution by the write component comprises:
iterating through the command queue according to an order in which the one or more commands are received by the command queue from the host system.

11. The method of claim 9, wherein the disabling of the read component comprises disabling components of the read component based on mapping data that describes components associated with the read component.

12. The method of claim 9, comprises:
in response to determining that the number does not surpass the write command threshold:
determining a current status of the read component;
determining that the current status of the read component indicates that the read component is disabled; and
in response to determining that the current status of the read component indicates that the read component is disabled:
determining a time to execute any remaining write commands in the sequence of write commands;
determining whether the time to execute is less than a latency time parameter; and
in response to determining that the time to execute is less than the latency time parameter, enabling the read component.

13. The method of claim 12, wherein the latency time parameter is user-defined.

14. The method of claim 9, wherein the write command threshold is user-defined.

15. At least one non-transitory machine-readable storage medium comprising instructions that, when executed by a processing device of a memory system, cause the processing device to perform operations comprising:
storing, in a command queue of a memory system, commands from a host system; and
while one or more commands are being retrieved from the command queue for execution:
analyzing, in the command queue, a sequence of commands of a same command type, the sequence of commands being queued next to be retrieved from the command queue for execution by the memory system; and
causing a read component of the memory system to be enabled or disabled based on a current status of the read component and based on analysis of the sequence of commands, the causing the read component to be enabled or disabled comprises:
determining whether the current status of the read component indicates that the read component is idle; and
in response to determining that the current status of the read component indicates that the read component is idle, disabling the read component.

16. The at least one non-transitory machine-readable storage medium of claim 15, wherein the operations comprise:
causing a write component of the memory system to be enabled or disabled based on a current status of the write component and based on analysis of the sequence of commands.

17. The at least one non-transitory machine-readable storage medium of claim 16, wherein the causing the write component to be enabled or disabled based on the current status of the write component and based on analysis of the sequence of commands comprises:
determining whether the current status of the write component indicates that the write component is idle; and
in response to determining that the current status of the write component indicates that the write component is idle, disabling the write component.

18. The at least one non-transitory machine-readable storage medium of claim 16, wherein the causing the write component to be enabled or disabled based on the current status of the write component and based on analysis of the sequence of commands comprises:
determining whether the current status of the write component indicates that the write component is idle; and
in response to determining that the current status of the write component indicates that the write component is not idle, disabling the write component after the current status of the write component changes to indicate that the write component is idle.

19. The at least one non-transitory machine-readable storage medium of claim 16, wherein the causing the write component to be enabled or disabled based on the current status of the write component and based on analysis of the sequence of commands comprises:
determining whether the current status of the write component indicates that the write component is idle; and
in response to determining that the current status of the write component indicates that the write component is not idle:
determining a number of the sequence of read commands; and in response to determining that the number surpasses a read command threshold:
  redetermining the current status of the write component; and
  enabling or disabling the write component based on the current status of the write component as redetermined.

20. The at least one non-transitory machine-readable storage medium of claim 15, wherein the analyzing the sequence of commands of the same command type comprises:
  iterating through the command queue according to an order in which the one or more commands are stored in the command queue.

\* \* \* \* \*